(12) United States Patent
Ogino

(10) Patent No.: US 6,954,185 B2
(45) Date of Patent: Oct. 11, 2005

(54) DISPLAY DEVICE

(75) Inventor: Takayuki Ogino, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 427 days.

(21) Appl. No.: 10/185,759

(22) Filed: Jun. 27, 2002

(65) Prior Publication Data

US 2003/0007227 A1 Jan. 9, 2003

(30) Foreign Application Priority Data

Jul. 3, 2001 (JP) ........................................ 2001-202052

(51) Int. Cl.[7] .................................................. G09G 5/00
(52) U.S. Cl. ............................ 345/7; 348/832; 348/835
(58) Field of Search ............................ 345/7–9; 348/832, 348/834, 835; 359/630, 631

(56) References Cited

U.S. PATENT DOCUMENTS

| | | | | |
|---|---|---|---|---|
| 4,890,902 A | * | 1/1990 | Doane et al. .................. 349/94 |
| 5,032,828 A | * | 7/1991 | Hirose et al. .................. 345/22 |
| 5,059,957 A | * | 10/1991 | Todoriki et al. ............... 345/7 |
| 5,526,065 A | * | 6/1996 | Todoriki ....................... 348/832 |
| 5,563,621 A | | 10/1996 | Silsby |
| 5,572,343 A | | 11/1996 | Okamura et al. |
| 6,144,920 A | * | 11/2000 | Mikame ....................... 701/212 |
| 6,434,450 B1 | * | 8/2002 | Griffin et al. .................. 701/1 |
| 6,573,831 B2 | * | 6/2003 | Ikeda et al. .................. 340/505 |
| 6,593,904 B1 | * | 7/2003 | Marz et al. ................... 345/87 |
| 6,653,948 B1 | * | 11/2003 | Kunimatsu et al. .... 340/995.19 |
| 6,703,999 B1 | * | 3/2004 | Iwanami et al. ............. 345/158 |
| 6,750,832 B1 | * | 6/2004 | Kleinschmidt ................. 345/7 |

* cited by examiner

Primary Examiner—Kent Chang
(74) Attorney, Agent, or Firm—Brinks Hofer Gilson & Lione

(57) ABSTRACT

A display device is provided for making images of a movie, a TV or the like invisible to a driver while the vehicle is traveling, but at the same time visible to a passenger riding in a front passenger seat. A viewing angle control shutter 20 using a liquid crystal is disposed facing a front surface of a liquid crystal display panel 19. When the vehicle is in a stopping state, the viewing angle control shutter 20 is set to off, thereby making the image that is displayed on the display panel 19 visible from the driver's seat side and the front passenger seat side. While the vehicle is traveling, the viewing angle control shutter 20 is driven such that the driver can watch an image produced by the navigation device 13, but cannot watch an image reproduced by a DVD reproduction device 14.

18 Claims, 12 Drawing Sheets

DISPLAY DEVICE

BACKGROUND OF THE INVENTION

1. Field of the Invention

The present invention relates to a display device capable of switching between a state in which an image is visible from one direction and a state in which the image is invisible from the one direction, while maintaining a state in which the image is visible from another specific direction. More particularly, the present invention relates to a display device suitable for a vehicle-mounted display device connected to a video signal output device (hereunder, referred to as "video device") such as a navigation device or a DVD reproducing device.

2. Description of the Related Art

Vehicles are equipped with not only audio devices such as a radio and a CD player, but also video devices such as a navigation device, a television (TV) tuner, and a DVD reproducing device. Accordingly, the vehicles are also provided with display devices for displaying the images, such as a liquid crystal display panel and the like.

Currently, the vehicle-mounted display device tends to have a wider screen. In such a display device with the wide-screen, for instance, the screen is divided into two areas. In one of the areas is displayed a map image supplied by the navigation device, and in the other area is displayed images supplied by the TV tuner, the DVD reproducing device or the like. This kind of display device is capable of the so-called double-screen display (or multi-screen display).

However, for safety reasons, a driver is prohibited from watching the images of a movie, a TV and the like while the vehicle is traveling. For this reason, the currently used vehicle-mounted video device is designed so as not to display the images of the movie or the TV during the travel of the vehicle. Therefore, although a passenger riding in a front passenger seat is not prohibited from watching the movie, the TV and so on, he nevertheless is not able to watch them during the travel of the vehicle.

SUMMARY OF THE INVENTION

The present invention has been made in view of the above-mentioned technical background, and it is an object of the present invention to provide a display device capable of switching between a state in which an image is visible from one direction and a state in which the image is invisible from the one direction, while maintaining a state in which the image is visible from another specific direction.

It is another object of the present invention to provide a display device having the function of making the images of the movie, the TV and the like, invisible to the driver during the travel of the vehicle, while making the movie, the TV and the like, visible to a passenger riding in the front passenger seat even during traveling.

To overcome the foregoing problems, the present invention provides a display device including a display section, and a viewing angle control shutter for switching between a first state in which an image displayed in a display range of at least one part of the display section is visible from both of a first direction and a second direction, and a second state in which the image is visible from only one of the first direction and the second direction.

In another embodiment, the present invention provides a display device that is mounted on the vehicle, including a display section, a viewing angle control shutter for switching between a first state in which an image displayed in a display range of at least one part of the display section is visible from both of a first direction and a second direction, and a second state in which the image is visible from only one of the first direction and the second direction, a video signal switching and synthesizing section for switching between or synthesizing a plurality of video signals to transmit the switched or synthesized video signal to the display section, and for supplying a control signal responsive to the video signal transmitted to the display section. A shutter driving section is connected to a vehicle stopping-state detecting sensor that detects whether or not the vehicle is in a stopping state, and drives the viewing angle control shutter according to the control signal and an output from the vehicle stopping-state detecting sensor.

The display device according to the present invention switches between the viewing angles thereof, for example, using the viewing angle control shutter for switching between the viewing angles by electrically changing the orientation of liquid crystal molecules. While the vehicle is traveling, upon the display of the images from the DVD reproducing device or the TV, the viewing angle control shutter is driven to set the state in which the images are invisible to the driver, but visible to the passenger riding in the front passenger seat. Thus, the passenger riding in the front passenger seat can watch the movie or the TV even during the travel of the vehicle, but the driver cannot, to thereby ensure safety while the vehicle is traveling. The viewing angle control shutter may be a liquid crystal shutter that is capable of controlling the viewing angles of the display device by electrically controlling the orientation of the liquid crystal molecules.

DESCRIPTION OF THE PREFERRED EMBODIMENTS

A display device according to embodiments of the present invention will be described in detail hereinafter with reference to the drawings.

(First Embodiment)

Figure 1:
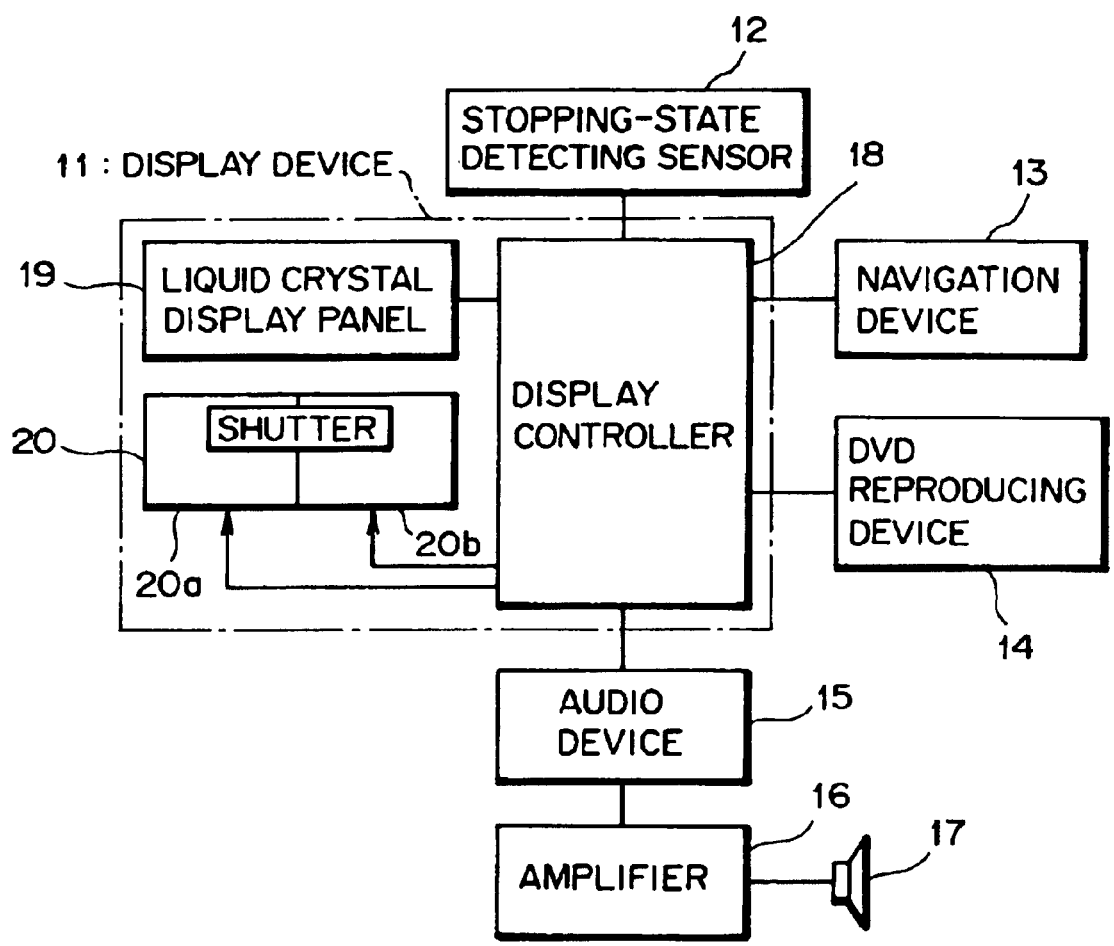
FIG. 1 is a block diagram showing the configuration of an audiovisual (AV) and vehicle navigation system using a display device of a first preferred embodiment in accordance with the present invention.

FIG. 1 is a block diagram showing the configuration of an audiovisual (AV) and vehicle navigation system using a display device of a first preferred embodiment in accordance with the present invention.

Referring now to FIG. 1, the AV and vehicle navigation system includes a display device 11, a stopping-state detecting sensor 12, a navigation device 13, a DVD reproducing device 14, an audio device 15, an amplifier 16, and a speaker 17. The display device 11 may be connected to other video devices such as a TV tuner and the like. However, to simplify the following explanation of the system, in this embodiment the display device 11 is connected only to the navigation device 13 and the DVD reproducing device 14, each of which is provided as a video device.

The stopping-state detecting sensor 12 is a sensor that detects whether or not the vehicle is in a stopping state. As examples, such a stopping-state detecting sensor 12 can be a speed sensor for detecting the traveling speed of the vehicle, a sensor for detecting the state of the brakes, or the like.

The navigation device 13 contains a map database, a global positioning system (GPS) receiver, a self-contained navigation sensor, and the like. By use of the map database, the GPS receiver, and the self-contained navigation sensor, the navigation device 13 detects a present position of the vehicle and supplies a video signal for displaying a map image covering the present vehicle position and its surroundings, a video signal for displaying an enlarged intersection map (hereinafter, simply referred to as "map image") marked with an arrow indicating the traveling direction of the vehicle, and an audio signal for voice guidance.

Figure 2:
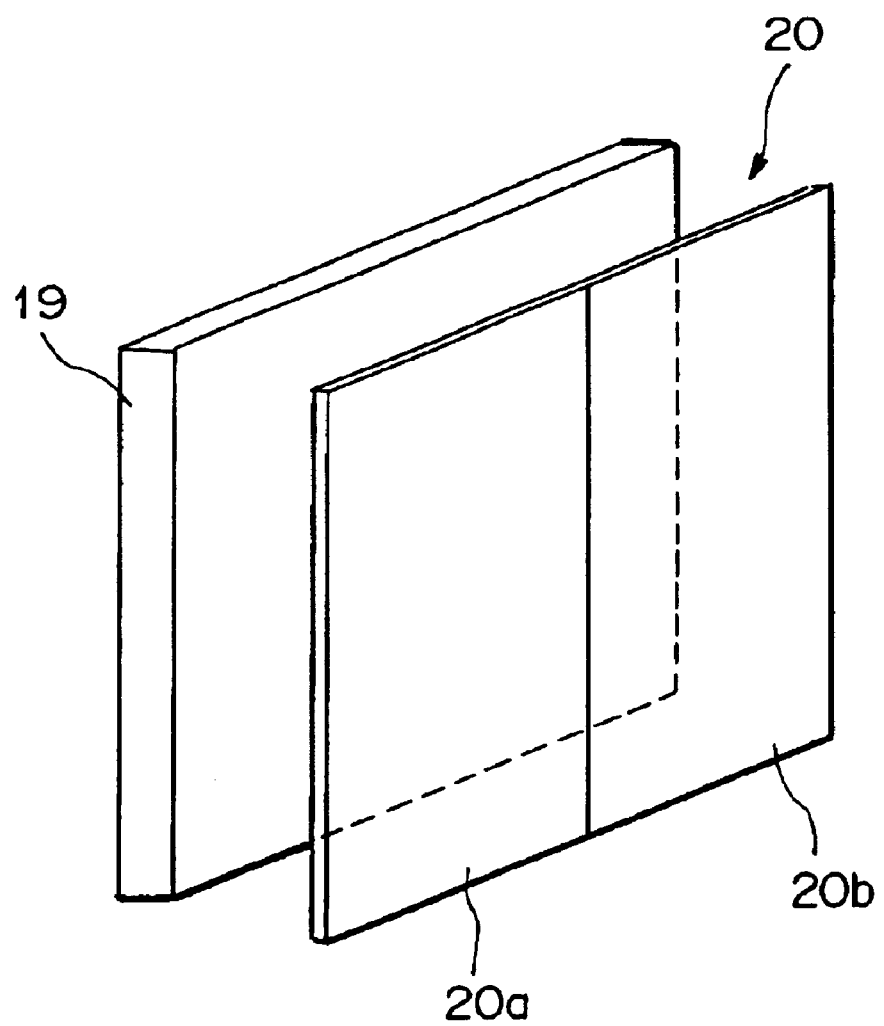
FIG. 2 illustrates a liquid crystal display panel and a viewing angle control shutter of the first preferred embodiment in accordance with the present invention.

The display device 11 includes a display controller 18, a liquid crystal display panel 19, and a viewing angle control shutter 20. The viewing angle control shutter 20, as shown in FIG. 2, is attached to the front surface (display surface) of the liquid crystal display panel 19. This viewing angle control shutter 20 is composed of a first shutter portion 20a that controls a viewing angle on the left side thereof with its center as a border, and a second shutter portion 20b that controls a viewing angle on the right side thereof. The viewing angle control shutter 20 will be explained in more detail later.

The display controller 18 individually controls the first shutter portion 20a and the second shutter portion 20b, to thereby make the images reproduced by the DVD reproducing device 14 invisible to the driver while the vehicle is traveling. Instead of the liquid crystal display panel 19, other displays such as a cathode ray tube (CRT) or an organic electro luminescence (EL) display panel may be used.

Figure 3:
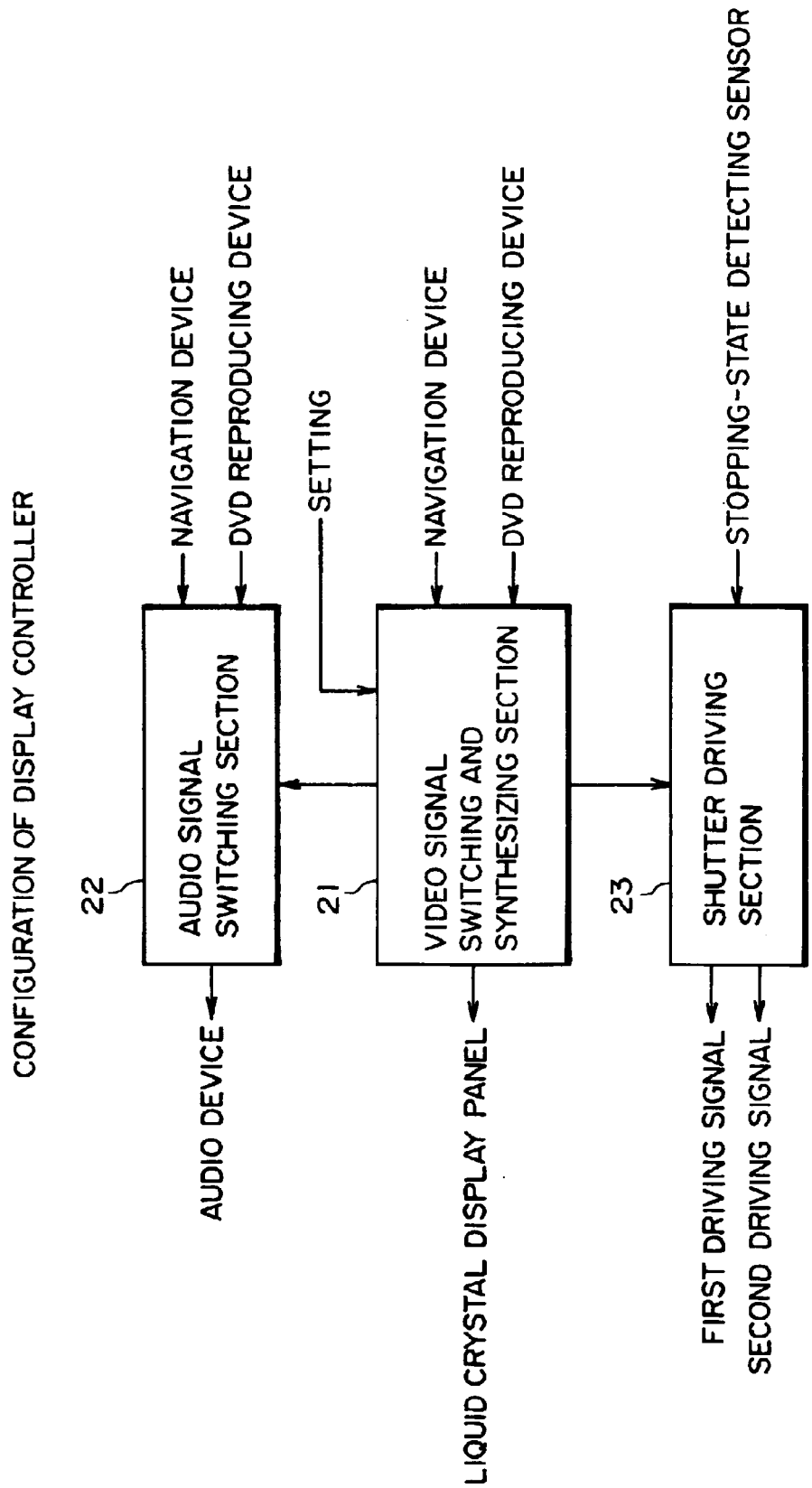
FIG. 3 is a block diagram showing the configuration of a display controller of the first preferred embodiment in accordance with the present invention.

FIG. 3 is a block diagram showing the configuration of the display controller 18. Referring now to FIG. 3, the display controller 18 includes a video signal switching and synthesizing section 21, an audio signal switching section 22, and a shutter driving section 23. To the video signal switching and synthesizing section 21 is provided video signals from the navigation device 13 and the DVD reproducing device 14, and then the video signal switching and synthesizing section 21 transmits to the liquid crystal display panel 19 one of the above-mentioned video signals or a signal into which both video signals are synthesized, according to a user's instruction. Further, the video signal switching and synthesizing section 21 supplies control signals responsive to the processes of switching between and/or synthesizing the video signals to the audio signal switching section 22 and the shutter driving section 23.

To the audio signal switching section 22 is provided audio signals from the navigation device 13 and the DVD reproducing device 14, and then the audio signal switching section 22 transmits to the audio device 15 one of the above-mentioned audio signals or both, based on the control signal supplied from the video signal switching and synthesizing section 21. The shutter driving section 23 generates a first driving signal for driving the first shutter portion 20a of the viewing angle control shutter 20 and a second driving signal for driving the second shutter portion 20b, according to the control signal supplied from the video signal switching and synthesizing section 21 and a signal supplied from the stopping-state detecting sensor 12.

The audio device 15 switches between the audio signal transmitted from the navigation device 13 or the DVD reproducing device 14 via the display controller 18, and the audio signal from a CD player and/or a radio tuner embedded in the audio device 15. The audio signal provided by the audio device 15 is transmitted to the speaker 17 via the amplifier 16.

Figure 4:
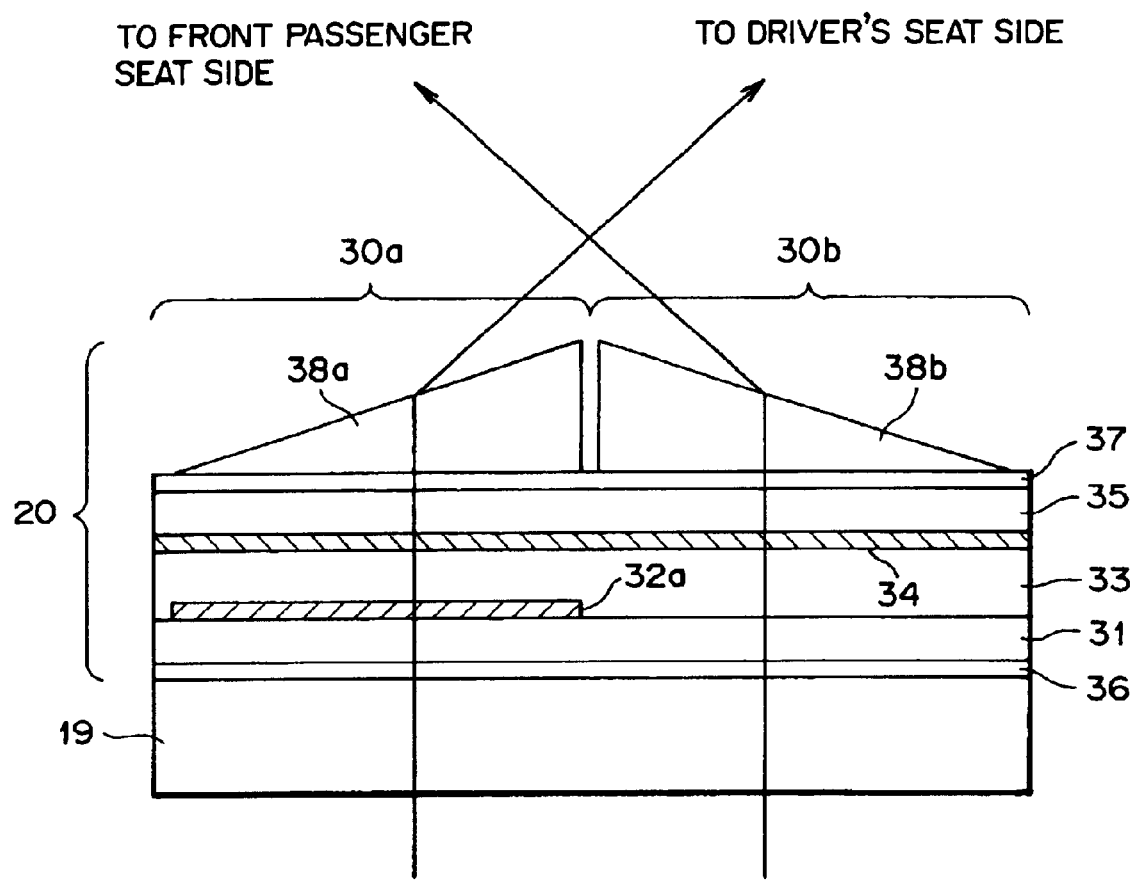
FIG. 4 is a schematic sectional view showing the construction of the viewing angle control shutter of the first preferred embodiment in accordance with the present invention.

FIG. 4 is a schematic sectional view showing the construction of one embodiment of the viewing angle control shutter 20. FIG. 4 shows an enlarged area corresponding to one pixel of the liquid crystal display panel 19.

The viewing angle control shutter 20 is arranged on (on the display surface of) the liquid crystal display panel 19 and includes transparent glass substrates 31 and 35, a liquid crystal 33 sealed between these substrates 31 and 35, polarizing plates 36 and 37 that are arranged facing the lower surface of the glass substrate 31 and the upper surface of the glass substrate 35, respectively, and microprism 38a and 38b disposed on the polarizing plate 37. As shown in FIG. 4, the area of one pixel of the liquid crystal display panel 19 corresponds to two same-sized areas 30a and 30b into which the viewing angle control shutter 20 is divided.

On the liquid crystal 33 side (the upper surface) of the substrate 31 is formed a transparent electrode 32a that is made of indium-tin oxide (ITO) or the like. The transparent electrode 32a is formed only in the area 30a, not the area 30b.

On the liquid crystal 33 side (the lower surface) of the substrate 35 is formed a transparent common electrode 34 that has the same size as the display area of the liquid crystal display panel 19 and is made of ITO or the like. The electrodes 32a and 34 and the liquid crystal 33 that is sandwiched between the electrodes 32a and 34 constitute shutter cells. Each shutter cell of the first shutter portion 20a (see FIG. 2) is driven according to the first driving signal supplied from the display controller 18, and each shutter cell of the second shutter portion 20b is driven according to the second driving signal supplied from the display controller 18.

The microprisms 38a and 38b are right-triangular-shaped in cross section, respectively, and are arranged on the polarizing plate 37 back to back. In detail, the microprism 38a is disposed on the area 30a side, while the microprism 38b is disposed on the area 30b side.

In the viewing angle control shutter 20 having the above-mentioned configuration, in the state in which a voltage is not applied between the electrode 32a and the electrode 34, light passing through the pixels of the liquid crystal display panel 19 is transmitted through the layers between the polarizing plates 36 and 37 to reach the microprisms 38a and 38b. The light in the area 30a is refracted by the microprism 38a to travel toward the driver's seat. The light in the area 30b is refracted by the microprism 38b to travel toward the front passenger seat side. Accordingly, at this time the driver and the passenger riding in the front passenger seat can watch the same image on the screen.

When a predetermined voltage is applied between the electrode 32a and the electrode 34, the orientation of the liquid crystal molecules positioned between the electrode 32a and the electrode 34 are changed, such that the light in the area 30a is interrupted. Thus, the image displayed on the liquid crystal display panel 19 becomes invisible to the driver. In contrast, the light in the area 30b passes through the layers between the polarizing plates 36 and 37, such that the image displayed on the liquid crystal display panel 19 is visible to the passenger riding in the front passenger seat.

The operation of the AV and vehicle navigation system having the above-mentioned configuration will be described hereinafter.

When the stopping-state detecting sensor 12 detects a stopping state of the vehicle, the display controller 18 sets the viewing angle control shutter 20 into an off state (not applying voltage). In this state, the display controller 18 transmits to the liquid crystal display panel 19 one of the video signals from the navigation device 13 and the DVD reproducing device 14, or the signal into which both video signals are synthesized, according to the user's setting. Thus, when the vehicle is in the stopping state, not only the passenger riding in the front passenger seat but also the driver can watch the map image supplied by the navigation device 13 and the movie reproduced by the DVD reproducing device 14.

Figure 5:
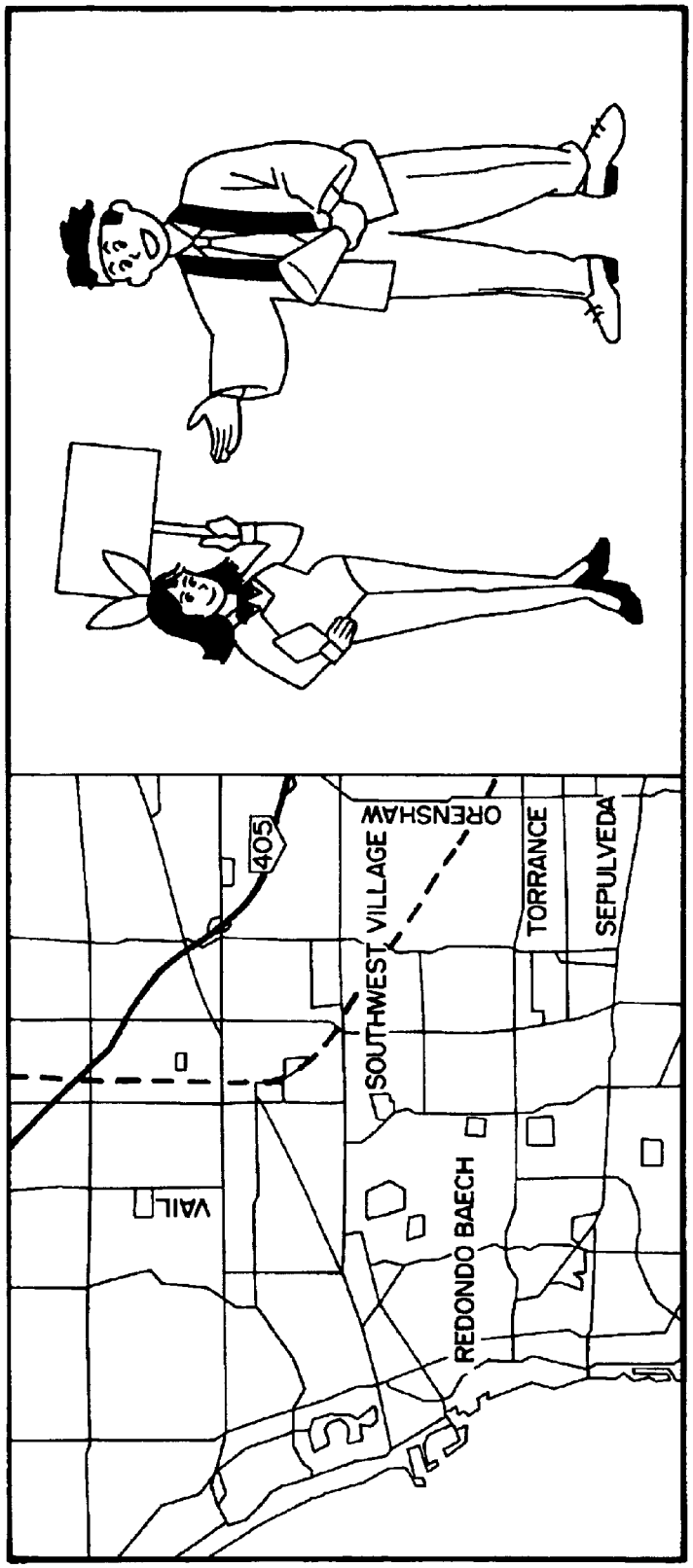
FIG. 5 is a diagram showing one example of a screen viewed from a front passenger seat in accordance with the first preferred embodiment of the present invention.
Figure 6:
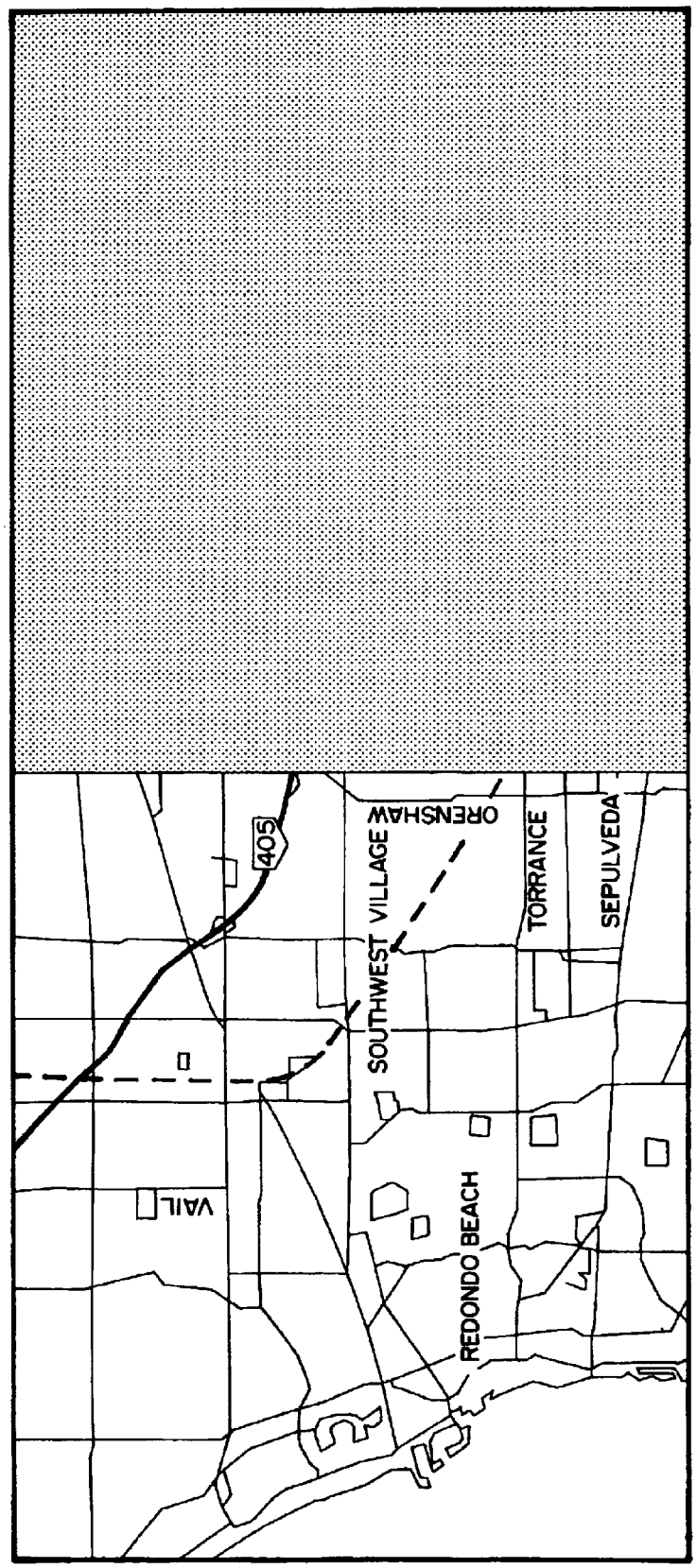
FIG. 6 is a diagram showing one example of a screen viewed from a driver's seat in accordance with the first preferred embodiment of the present invention.

While the vehicle is traveling, the display controller 18 controls the viewing angle control shutter 20 so as to make the image that is reproduced by the DVD reproducing device 14 invisible to the driver, according to the signal from the stopping-state detecting sensor 19. For instance, when displaying the image from the navigation device 13 and the image from the DVD reproducing device 14 on the display device 12 in a double-screen display mode, the shutter portion positioned on the side of displaying the image from the DVD reproducing device 14 (in this example, the first shutter portion 20a) is set to off. Thus, as shown in FIG. 5, from the front passenger seat is visible not only the map image supplied from the navigation device 13, but also the movie reproduced by the DVD reproducing device 14. However, as shown in FIG. 6, the image positioned in the display range for displaying the movie reproduced by the DVD reproducing device 14 is interrupted by the viewing angle control shutter 20 (specifically, the first shutter portion 20a), such that the driver cannot watch the movie. It should be noted that the driver can listen to the voice from the speaker 17.

Figure 7:
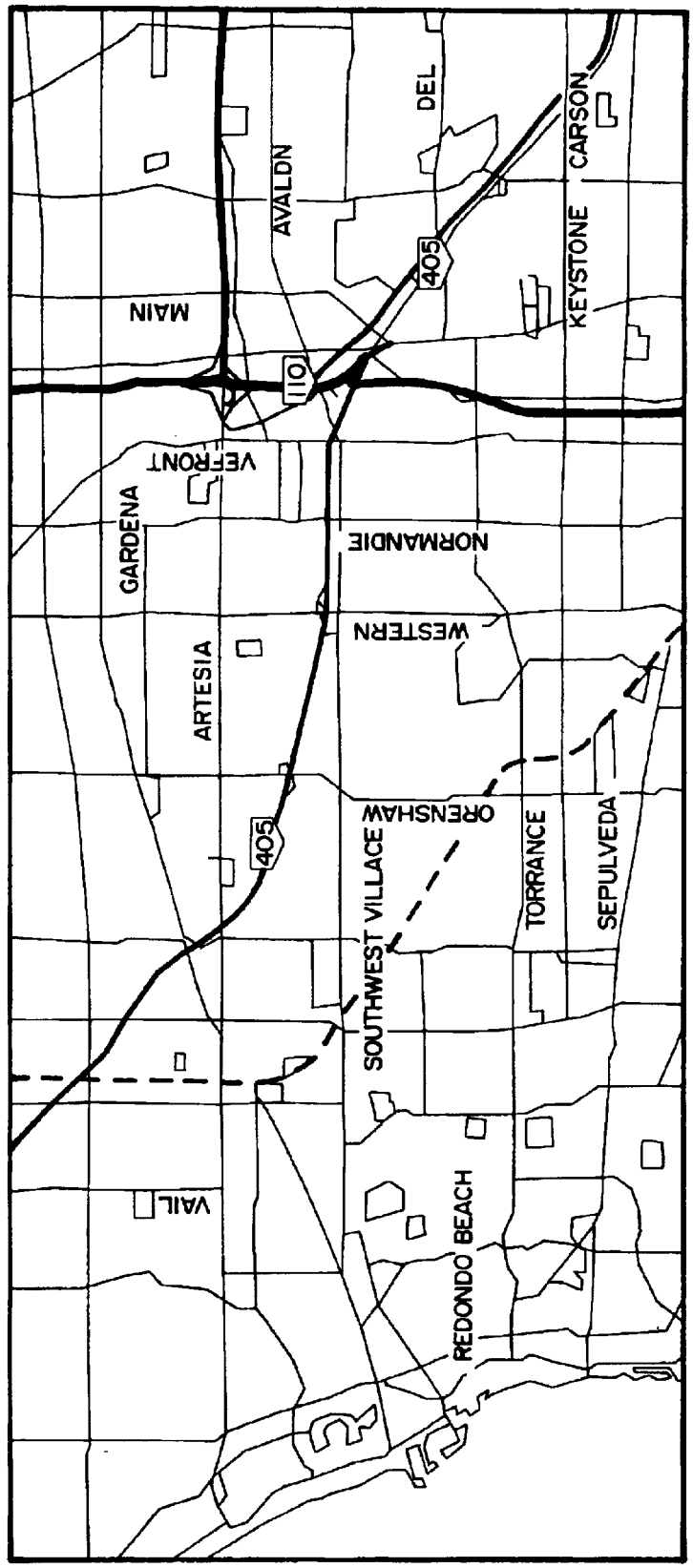
FIG. 7 is a diagram showing one example in the case of displaying a map image on a full screen in accordance with the first preferred embodiment of the present invention.

After the reproduction of the movie is finished, the DVD reproducing device 14 stops supplying the video signal, and a full-screen display mode is automatically set by the display controller 18, such that the map image supplied from the navigation device 13 is displayed on the full screen of the liquid crystal display panel 19 as shown in FIG. 7. At this time, the viewing angle control shutter 20 enters the off state (not applying voltage), so that the map image displayed on the liquid crystal display panel 19 is visible from both of the driver's seat and the front passenger seat.

If it is desired that the movie reproduced by the DVD reproducing device 14 is displayed in the full-screen display mode while the vehicle is traveling, the display controller 18 drives the first and second shutter portions 20a and 20b of the viewing angle control shutter 20, whereby the passenger riding in the front passenger seat can watch the movie reproduced by the DVD reproducing device in the full-screen display mode, but the driver cannot watch the movie.

As described above, in one preferred embodiment of the present invention, the display controller 18 controls the viewing angle control shutter 20, according to the output from the stopping-state detecting sensor 19 and the output from the navigation device 13 and the DVD reproducing device 14. Thus, even while the vehicle is traveling, the passenger riding in the front passenger seat can watch the movie reproduced by the DVD reproducing device 14. Further, even if the movie is being reproduced by the DVD reproducing device 14, the driver cannot watch the movie while the vehicle is traveling, to thereby ensure safety during the travel of the vehicle.

(Second Embodiment)

Figure 8:
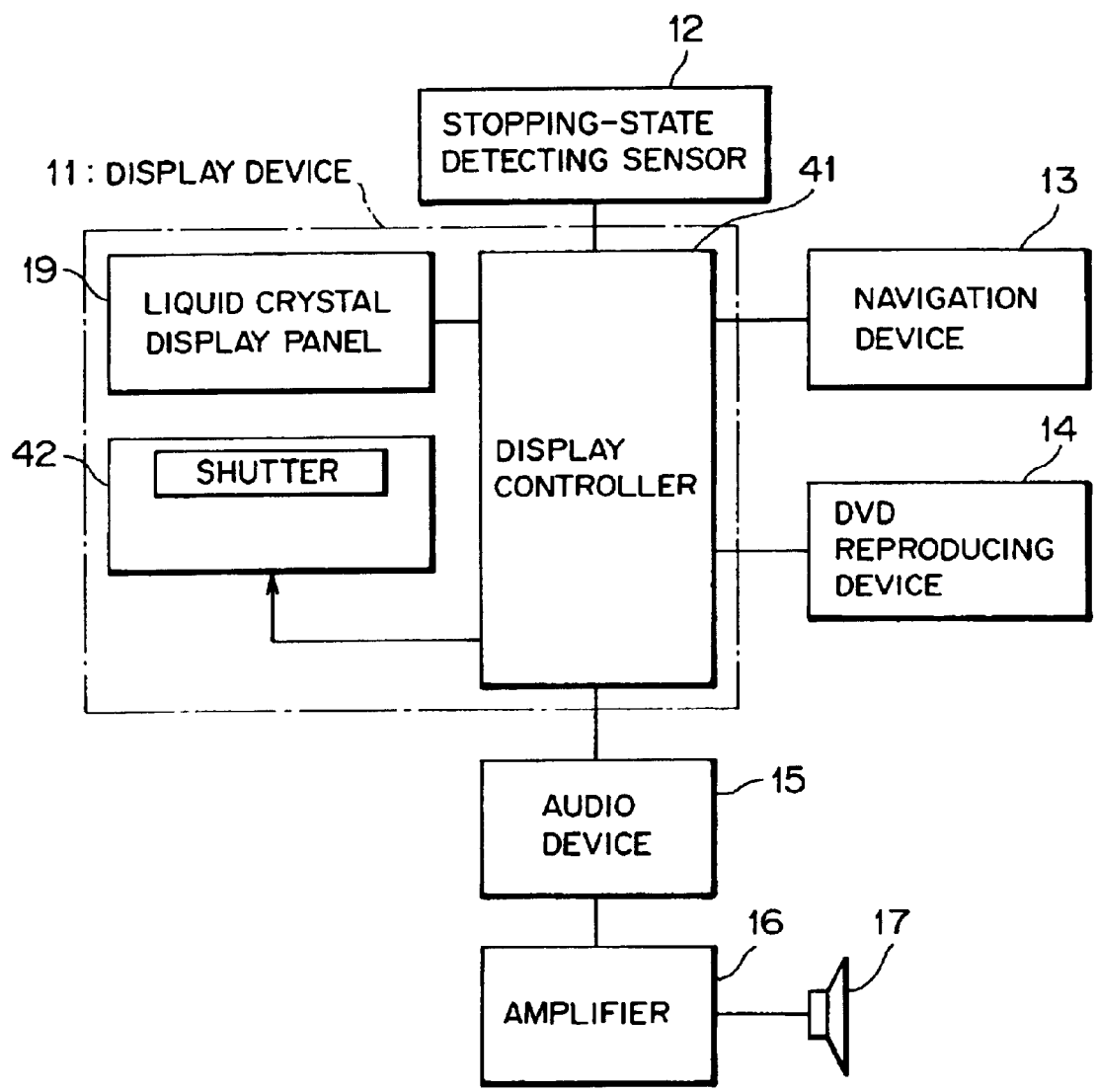
FIG. 8 is a block diagram showing the configuration of an audiovisual (AV) and vehicle navigation system using a display device of a second preferred embodiment in accordance with the present invention.
Figure 9:
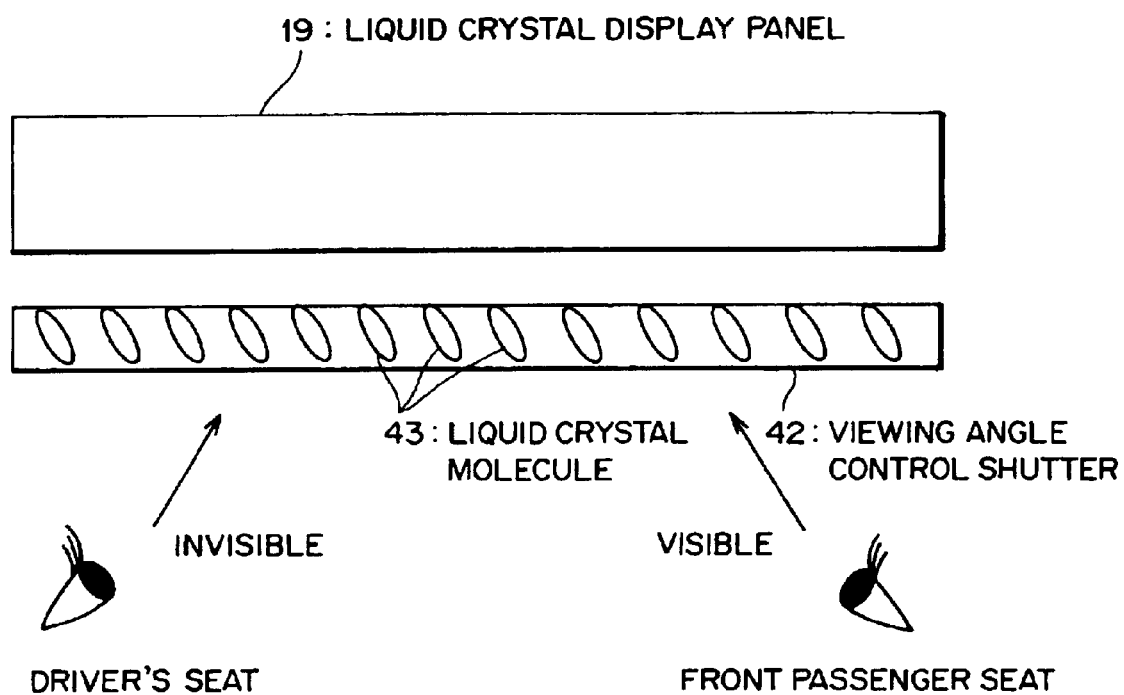
FIG. 9 is a schematic view showing the construction of the viewing angle control shutter of the second preferred embodiment in accordance with the present invention.
Figure 10:
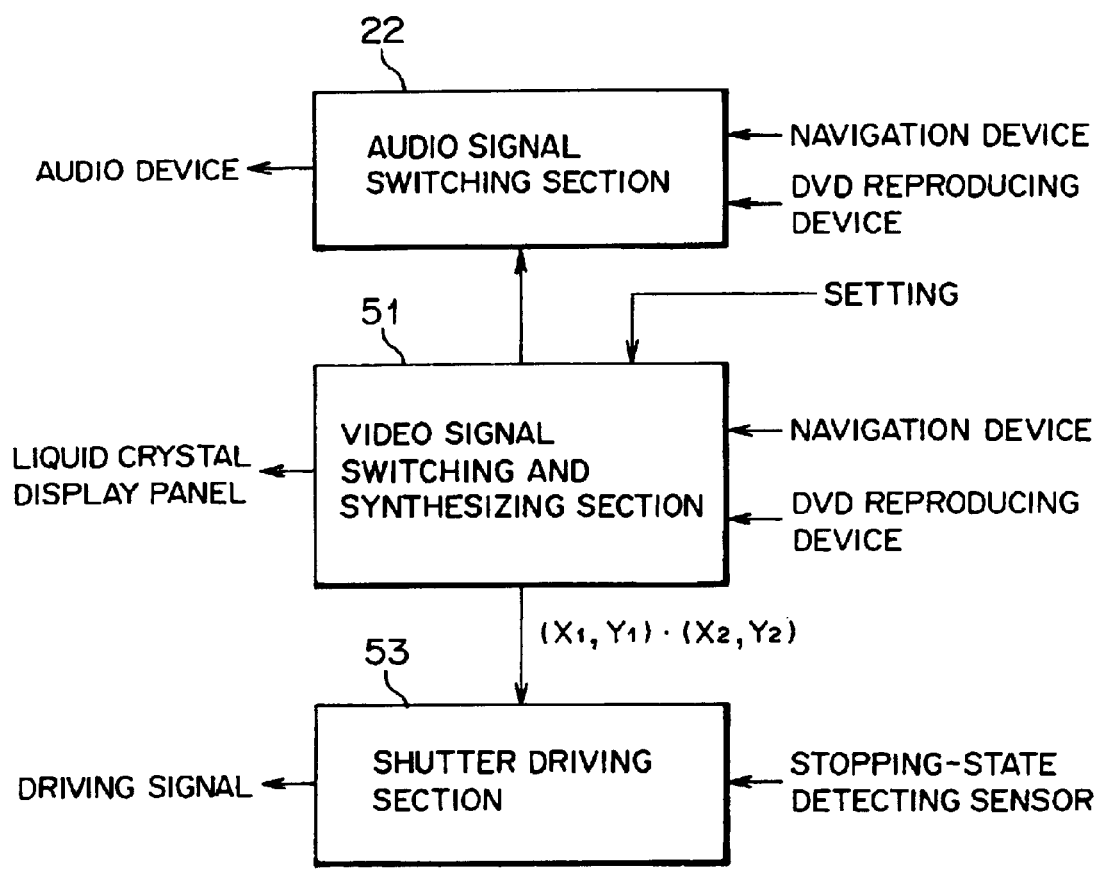
FIG. 10 is a block diagram showing the configuration of a display controller of the second preferred embodiment in accordance with the present invention.

FIG. 8 is a block diagram showing the configuration of an AV and vehicle navigation system using a display device of a second preferred embodiment in accordance with the present invention; FIG. 9 is a schematic view showing the construction of the viewing angle control shutter of the second preferred embodiment; and FIG. 10 is a block diagram showing the configuration of a display controller of the second preferred embodiment. Note that in FIG. 8 and FIG. 10 the same components as those shown in FIG. 1 and FIG. 3 are given the same reference characters, respectively, and are not explained in detail hereunder.

First, referring now to FIG. 9, a viewing angle control shutter 42 will be explained. The viewing angle control shutter 42 is disposed on the display screen of the liquid crystal display panel 19, and has a plurality of shutter cells corresponding to the respective pixels of the liquid crystal display panel 19. These shutter cells can tilt the liquid crystal molecules 43 in a predetermined direction by applying a voltage between a pair of electrodes (not shown) sandwiching the liquid crystal. In the state in which the liquid crystal molecules 43 are oriented in the predetermined direction, light traveling along the major axis of the liquid crystal molecule 43 passes through the viewing angle control shutter 42, while light traveling along the minor axis of the liquid crystal molecule 43 is interrupted by the viewing angle control shutter 42. Accordingly, the image displayed on the liquid crystal display panel 19 is visible from the front passenger seat side, but is invisible from the driver's seat side.

The shutter cells of the viewing angle control shutter 42 are individually controlled by a shutter driving section 53 of a display controller 41. As shown in FIG. 10, supplied to a video signal switching and synthesizing section 51 is a video signal provided from the navigation device 13 and a video signal provided from the DVD reproducing device 14, and the video signal switching and synthesizing section 51 supplies to the liquid crystal display panel 19 one of the above-mentioned video signals or a signal into which both video signals are synthesized, according to the user's setting. Further, the video signal switching and synthesizing section 51 supplies to the shutter driving section 53 display position data for indicating the display range of the images reproduced by the DVD reproducing device 14. In this embodiment, the display range data is provided as the x and y coordinates (X1, Y1) of the point positioned on the upper left corner of a rectangular region where the images reproduced by the DVD reproducing device 14 are displayed, and the x and y coordinates (X2, Y2) of the point positioned on the lower right corner thereof, to the shutter driving section 53.

Figure 11:
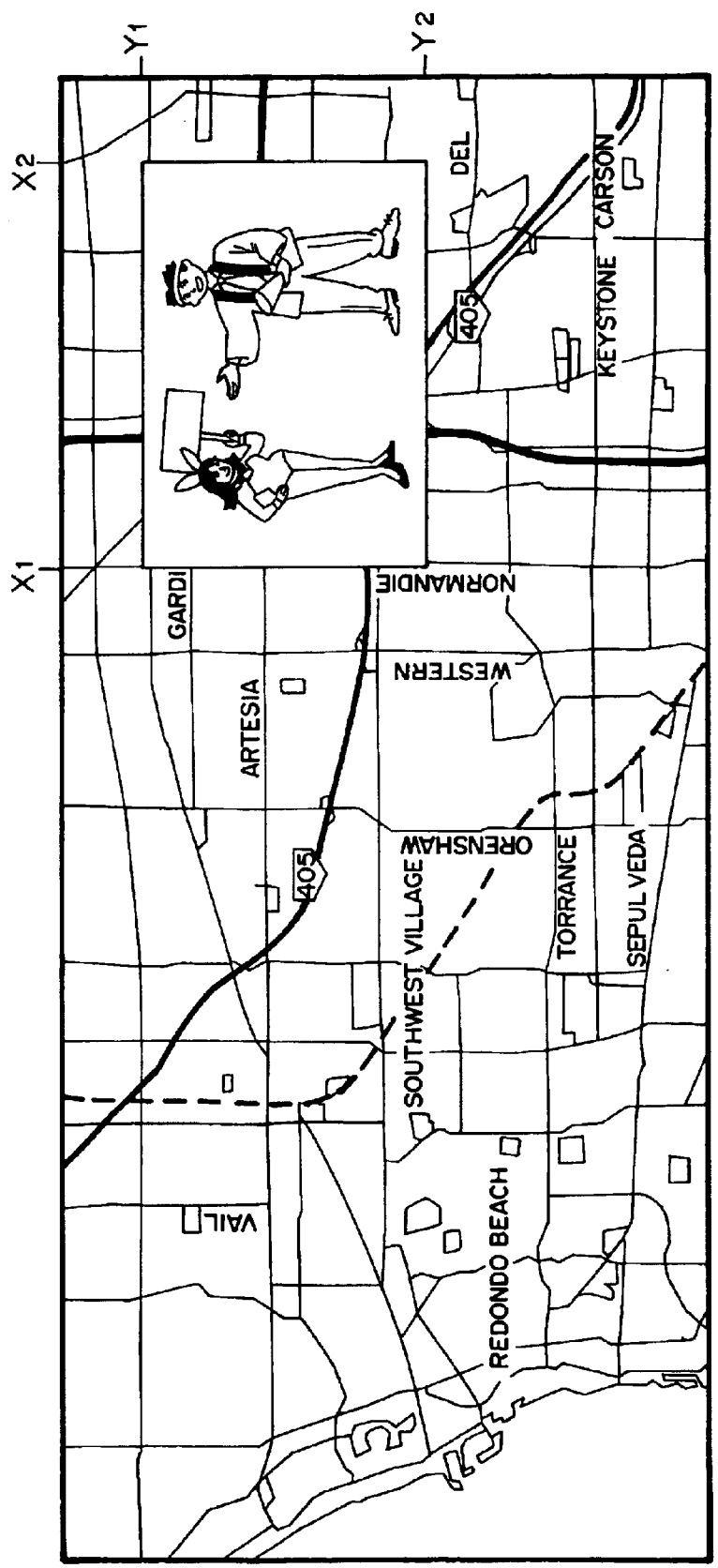
FIG. 11 is a diagram showing one example of a screen viewed from a front passenger seat in accordance with the second preferred embodiment of the present invention.

The shutter driving section 53 drives all the shutter cells in the range of the images reproduced by the DVD reproducing device 14 according to the display range data supplied from the video signal switching and synthesizing section 51. Thus, as shown in FIG. 11, the passenger riding in the front passenger seat can watch the map image provided by the navigation device 13 and the movie reproduced by the DVD reproducing device 14 at the same time. But the driver can watch only the map image provided by the navigation device 13, and cannot watch the movie reproduced by the DVD reproducing device 14.

In the same way as the described first embodiment, according to the display device of this embodiment, the movie reproduced by the DVD reproducing device 14 is constantly visible from the front passenger seat, but invisible from the driver's seat while the vehicle is traveling, to thereby ensure safety during the travel of the vehicle.

Further, in this embodiment the data indicating the display range of the images reproduced by the DVD reproducing device 14 is transmitted from the video signal switching and synthesizing section 51 to the shutter driving section 53. According to this data, the shutter driving section 53 drives only the shutter cells positioned in the display range of the images reproduced by the DVD reproducing device 14. Therefore, the display device of this embodiment is applicable in the case of displaying the images reproduced by the DVD reproducing device 14 at a desired position on the liquid crystal display panel 19.

(Third Embodiment)

Figure 12:
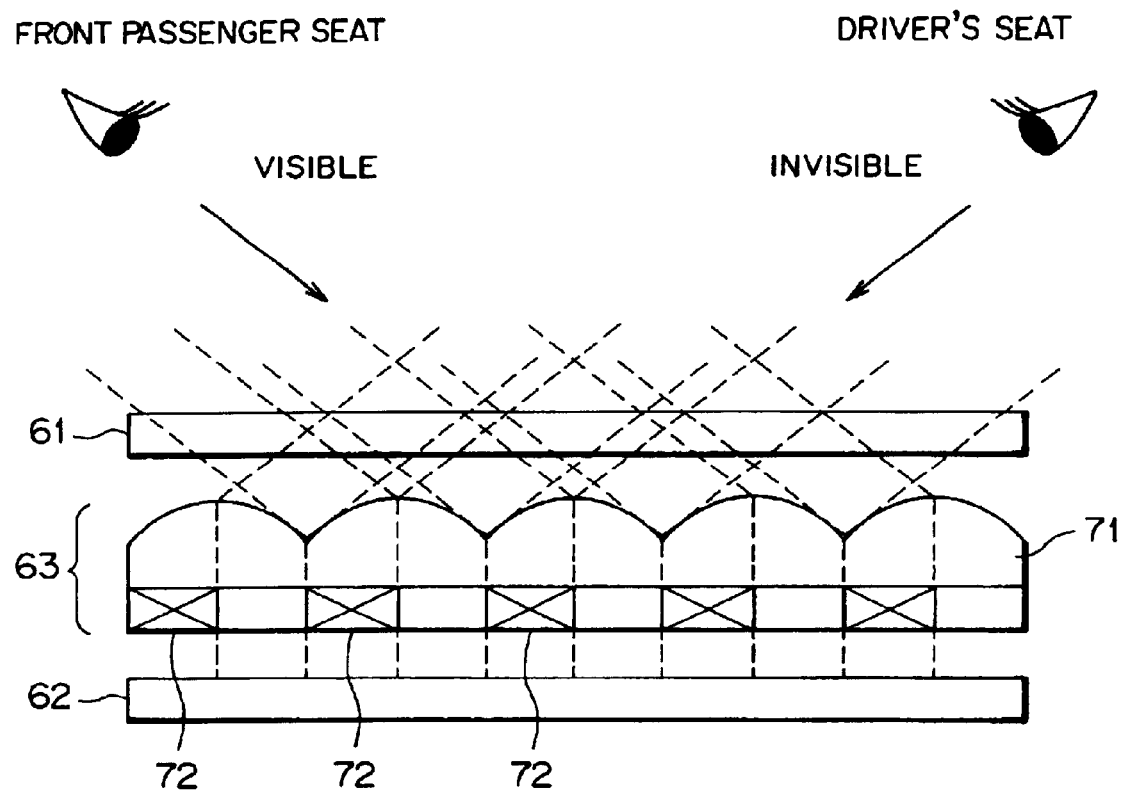
FIG. 12 is a schematic diagram showing the construction of a display device of a third preferred embodiment in accordance with the present invention.

FIG. 12 is a schematic diagram showing the construction of a display device of a third preferred embodiment in accordance with the present invention. It should be, however, noted that the same display controller as that explained in the first embodiment or the second embodiment can be used in the third embodiment, thus omitting the explanation of the display controller.

In this embodiment, there is provided a viewing angle control shutter 63 between a liquid crystal display panel 61 and a backlight 62. The viewing angle control shutter 63 includes a plurality of cylindrical lenses 71 that are arranged side by side, and a plurality of shutter cells 72. In the case where the shutter cells 72 are in the off state, light emitted from the backlight 62 is divided into a light beam traveling toward the driver's seat and a light beam traveling toward the front passenger seat by the cylindrical lenses 71. These light beams pass through the liquid crystal display panel 61 to travel toward the respective sides, namely the driver's seat side and the front passenger seat side, whereby the image displayed on the liquid crystal display panel 61 is visible from the driver's seat side and the front passenger seat side.

The shutter cells 72 each include a pair of transparent electrodes and a liquid crystal sandwiched between the transparent electrodes. The shutter cells 72 are positioned in light paths leading toward the driver's seat. There is no shutter cell in light paths leading toward the front passenger seat. Therefore, when the light traveling toward the driver's seat is interrupted by the shutter cells 72, the image displayed on the liquid crystal display panel 61 is visible to the passenger riding in the front passenger seat, but invisible to the driver.

The display device of this embodiment provides the same kind of results as the display devices disclosed in the first and second embodiments provide.

It should be noted that in each of the described first, second and third embodiments, the present invention is not limited to the case where the viewing angle is controlled in such a manner that the images reproduced by the DVD reproducing device are invisible to the driver while the vehicle is traveling. For example, according to the present invention, when displaying the picture of a TV, moving images obtained from the Internet, or images produced by a TV telephone, such images may not be displayed to the driver, but may be displayed to the passenger riding in the front passenger seat while the vehicle is traveling.

As described above in detail, the display device according to the present invention includes the display section, and the viewing angle control shutter for switching between a first state in which the image displayed in the display range of at least one part of the display section is visible from both of the first direction and the second direction, and a second state in which the image is visible from only one of the first direction and the second direction. In a specific application, while the vehicle is traveling, the movie reproduced by the DVD reproducing device is visible to the passenger riding in the front passenger seat, but invisible to the driver, to thereby ensure safety during the travel of the vehicle.

What is claimed is:

1. A display device comprising:
    a display section including at least two non-overlapping display portions; and
    a viewing angle control shutter for switching between a first state in which images displayed on both of said two display portions of said display section are visible from both of a first direction and a second direction, and a second state in which an image on a first display portion of the display section is visible from at least said first direction, but an image on a second display portion of the display section is visible from only said second direction.

2. The display device according to claim 1, wherein said viewing angle control shutter is a liquid crystal shutter.

3. The display device according to claim 1, wherein said first direction is a direction from a driver's seat to said display section, and said second direction is a direction from a passenger seat to said display section.

4. A display device that is mounted on a vehicle, comprising:
    a display section including at least two non-overlapping display portions;
    a viewing angle control shutter for switching between a first state in which images displayed on both of said two display portions of said display section are visible from both of a first direction and a second direction, and a second state in which an image on a first display portion of the display section is visible from at least said first direction, but an image on a second display portion of the display section is visible from only said second direction;
    a video signal switching and synthesizing section for switching between or synthesizing a plurality of received video signals to supply said switched or synthesized video signal to said display section, and for supplying a control signal responsive to said video signal supplied to said display section; and
    a shutter driving section connected to a vehicle stopping-state detecting sensor that detects whether or not the vehicle is in a stopping state, and for driving said viewing angle control shutter according to said control signal and an output from said vehicle stopping-state detecting sensor.

5. The display device according to claim 4, wherein said viewing angle control shutter switches between viewing angles by electrically controlling the orientation of a liquid crystal molecule.

6. The display device according to claim 5, wherein said viewing angle control shutter tilts the liquid crystal molecule in a predetermined direction by applying a voltage between a pair of electrodes sandwiching a liquid crystal.

7. The display device according to claim 4, wherein, when said shutter driving section receives from said vehicle stopping-state detecting sensor a signal indicating that the vehicle is in the stopping state, said shutter driving section drives said viewing angle control shutter into said first state.

8. The display device according to claim 4, wherein, when said shutter driving section receives from said vehicle stopping-state detecting sensor a signal indicating that the vehicle is traveling, said shutter driving section drives said viewing angle control shutter into said second state.

9. The display device according to claim 4, wherein, when said shutter driving section receives a signal indicating that the vehicle is traveling from said vehicle stopping-state detecting sensor and a signal indicating a navigation image from said video signal switching and synthesizing section, said shutter driving section drives said viewing angle control shutter into said first state.

10. The display device according to claim 4, wherein, when said shutter driving section receives a signal indicating that the vehicle is traveling from said vehicle stopping-state detecting sensor and a signal indicating an image to be reproduced by a moving image reproducing device from said video signal switching and synthesizing section, said shutter driving section drives said viewing angle control shutter into said second state.

11. The display device according to claim 4, wherein, when said shutter driving section receives a signal indicating that the vehicle is traveling from said vehicle stopping-state detecting sensor, and screen range data on an image to be reproduced by a moving image reproducing device from said video signal switching and synthesizing section, said shutter driving section drives said viewing angle control shutter such that the screen range of the moving image to be reproduced is in said second state.

12. The display device according to claim 4, wherein, when said shutter driving section receives a signal indicating that the vehicle is traveling from said vehicle stopping-state detecting sensor, and navigation image range data and image range data to be reproduced by a moving image reproducing device from said video signal switching and synthesizing section, said shutter driving section drives said viewing angle control shutter such that said navigation image range is in said first state and said image range to be reproduced by the moving image reproducing device is in said second state.

13. The display device according to claim 12, wherein, when said moving image reproducing device stops transmitting the video signal, said video signal switching and synthesizing section transmits a signal to said shutter driving section for displaying said navigation image on a full screen, and responsive to said signal, said shutter driving section drives said viewing angle control shutter such that said full screen is in said first state.

14. The display device according to claim 10, wherein said moving image reproducing device is one of a television or a DVD reproducing device.

15. A method of operating a display device comprising:
providing a display section including at least two non-overlapping display portions;
providing a viewing angle control shutter; and
switching the viewing angle control shutter between a first state in which images displayed on both of said two display portions of said display section are visible from both of a first direction and a second direction different from said first direction, and a second state in which an image on a first display portion of the display section is visible from at least said first direction, but an image on a second display portion of the display section is visible from said second direction and not from said first direction.

16. The method according to claim 15, wherein the viewing angle control shutter is a liquid crystal shutter. .

17. The method according to claim 15, wherein the display device is mounted in a vehicle, the first direction is from a driver's seat to said display section, and the second direction is from a passenger seat to said display section.

18. The method according to claim 17, wherein the viewing angle control shutter is in said first state when the vehicle is stopped, and the viewing angle control shutter is in said second state when the vehicle is traveling.

* * * * *